(12) United States Patent
Iwasaki et al.

(10) Patent No.: US 7,265,874 B2
(45) Date of Patent: Sep. 4, 2007

(54) IMAGE PROCESSING APPARATUS AND METHOD

(75) Inventors: Osamu Iwasaki, Tokyo (JP); Naoji Otsuka, Kanagawa (JP); Hitoshi Nishikori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 955 days.

(21) Appl. No.: 10/410,347

(22) Filed: Apr. 10, 2003

(65) Prior Publication Data

US 2003/0193679 A1   Oct. 16, 2003

(30) Foreign Application Priority Data

Apr. 10, 2002   (JP) ............................. 2002-108059

(51) Int. Cl.
*H04N 1/40* (2006.01)
*G06K 15/00* (2006.01)

(52) U.S. Cl. .................. 358/3.01; 358/3.03; 358/3.05; 382/251; 382/252

(58) Field of Classification Search ............... 358/3.01, 358/3.03, 3.04, 3.05, 3.21, 3.24; 382/251, 382/252
See application file for complete search history.

(56) References Cited

U.S. PATENT DOCUMENTS

| | | | |
|---|---|---|---|
| 5,621,546 A | 4/1997 | Klassen et al. | 358/536 |
| 5,949,965 A | 9/1999 | Gondek | 395/109 |
| 5,973,803 A | 10/1999 | Cheung et al. | 358/534 |
| 6,363,172 B1 | 3/2002 | Cheung et al. | 382/167 |
| 6,501,564 B1 * | 12/2002 | Schramm et al. | 358/1.9 |
| 6,870,644 B2 * | 3/2005 | Schramm et al. | 358/3.05 |
| 7,002,708 B2 * | 2/2006 | Damera-Venkata | 358/1.9 |

FOREIGN PATENT DOCUMENTS

| | | |
|---|---|---|
| JP | 3-88570 | 4/1991 |
| JP | 3-243064 | 10/1991 |
| JP | 7-193726 | 7/1995 |
| JP | 8-279920 | 10/1996 |
| JP | 10-200742 | 7/1998 |
| JP | 11-10918 | 1/1999 |

OTHER PUBLICATIONS

Robert W. Floyd and Louis Steinberg, "An Adaptive Algorithm for Spatial Greyscale," Proceedings of the Society for Information Display, vol. 17 No. 2, 75 (Second Quarter, 1976).

* cited by examiner

*Primary Examiner*—Thomas D. Lee
(74) *Attorney, Agent, or Firm*—Fitzpatrick, Cella, Harper & Scinto

(57) ABSTRACT

An image processing apparatus processes multivalued color image data that includes a plurality of color components. The apparatus includes an adding unit to add per-color-component quantization error values from a neighboring pixel to respective ones of a plurality of color components included in a pixel of interest, and a quantization unit to correlate a sum of the values of each of the color components to which the error value has been added by the adding unit to a sum of values after conversion, and deciding the value of each color component after conversion upon distributing the sum of pixel values after the conversion in accordance with the ratio of each of the color components before conversion. In addition, a coefficient decision unit decides diffusion coefficients, which diffuse quantization error to neighboring pixels, based upon the value of each of the plurality of color components included in the pixel of interest.

10 Claims, 19 Drawing Sheets

FIG. 5

| $O_0, O_1$ | $O'_0, O'_1$ |
|---|---|
| 0 | 0 |
| 1 | 255 |

|  | $O_0$ | $O_1$ |
|---|---|---|
| ○ | 0 | 0 |
| ⊙ | 1 | 0 |
| ⊕ | 0 | 1 |
| ⊘ | 2 | 0 |
| ⊛ | 1 | 1 |
| ⊖ | 0 | 2 |
| ⊘ | 2 | 1 |
| ⊗ | 1 | 2 |
| ● | 2 | 2 |

FIG. 7

| $O_0, O_1$ | $O'_0, O'_1$ |
|---|---|
| 0 | 0 |
| 1 | 128 |
| 2 | 255 |

FIG. 9A

| $O_0$ | $O'_0$ |
|---|---|
| 0 | 0 |
| 1 | 128 |
| 2 | 255 |

FIG. 9B

| $O_1$ | $O'_1$ |
|---|---|
| 0 | 0 |
| 1 | 255 |

FIG. 10

| I'₀, I'₁ | g₀, g₁ |
|---|---|
| 383 | 8 |
| 382 | 8 |
| 381 | 8 |
| . | . |
| . | . |
| 256 | 6 |
| 255 | 6 |
| 254 | 6 |
| . | . |
| . | . |
| . | . |
| 2 | 2 |
| 1 | 2 |
| 0 | 2 |
| −1 | 2 |
| . | . |
| . | . |
| −127 | 0 |
| −128 | 0 |

FIG. 11

| I'$_0$, I'$_1$ | g$_0$, g$_1$ |
|---|---|
| 319 | 6 |
| 318 | 6 |
| 317 | 6 |
| . | . |
| . | . |
| 256 | 5 |
| 255 | 5 |
| 254 | 5 |
| . | . |
| . | . |
| . | . |
| 2 | 2 |
| 1 | 2 |
| 0 | 2 |
| −1 | 2 |
| . | . |
| . | . |
| −62 | 0 |
| −63 | 0 |

FIG. 13

| | | \multicolumn{7}{c}{$I_0$} | | | | | | |
|---|---|---|---|---|---|---|---|---|
| | | 0 | 1 | 2 | 3~14 | 15 | 16~254 | 255 |
| $I_1$ | 0 | $S_0=1$<br>$S_1=1$ | $S_0=1$<br>$S_1=1$ | $S_0=1$<br>$S_1=1$ | $S_0=2$<br>$S_1=1$ | $S_0=2$<br>$S_1=1$ | $S_0=0$<br>$S_1=1$ | $S_0=0$<br>$S_1=1$ |
| | 1 | $S_0=1$<br>$S_1=1$ | $S_0=1$<br>$S_1=1$ | $S_0=1$<br>$S_1=1$ | $S_0=2$<br>$S_1=1$ | $S_0=2$<br>$S_1=1$ | $S_0=0$<br>$S_1=1$ | $S_0=0$<br>$S_1=1$ |
| | 2 | $S_0=1$<br>$S_1=1$ | $S_0=1$<br>$S_1=1$ | $S_0=2$<br>$S_1=2$ | $S_0=2$<br>$S_1=2$ | $S_0=2$<br>$S_1=2$ | $S_0=0$<br>$S_1=2$ | $S_0=0$<br>$S_1=2$ |
| | 3~14 | $S_0=1$<br>$S_1=2$ | $S_0=1$<br>$S_1=2$ | $S_0=2$<br>$S_1=2$ | $S_0=2$<br>$S_1=2$ | $S_0=2$<br>$S_1=2$ | $S_0=0$<br>$S_1=2$ | $S_0=0$<br>$S_1=2$ |
| | 15 | $S_0=1$<br>$S_1=2$ | $S_0=1$<br>$S_1=2$ | $S_0=2$<br>$S_1=2$ | $S_0=2$<br>$S_1=2$ | $S_0=0$<br>$S_1=0$ | $S_0=0$<br>$S_1=0$ | $S_0=0$<br>$S_1=0$ |
| | 16~254 | $S_0=1$<br>$S_1=0$ | $S_0=1$<br>$S_1=0$ | $S_0=2$<br>$S_1=0$ | $S_0=2$<br>$S_1=0$ | $S_0=0$<br>$S_1=0$ | $S_0=0$<br>$S_1=0$ | $S_0=0$<br>$S_1=0$ |
| | 255 | $S_0=1$<br>$S_1=0$ | $S_0=1$<br>$S_1=0$ | $S_0=2$<br>$S_1=0$ | $S_0=2$<br>$S_1=0$ | $S_0=0$<br>$S_1=0$ | $S_0=0$<br>$S_1=0$ | $S_0=0$<br>$S_1=0$ |

FIG. 14A

| $S_0$ | $W0_0$ | $W1_0$ | $W2_0$ | $W3_0$ |
|---|---|---|---|---|
| 0 | 8/16 | 5/16 | 2/16 | 1/16 |
| 1 | 12/16 | 2/16 | 2/16 | 0/16 |
| 2 | 10/16 | 2/16 | 3/16 | 1/16 |

FIG. 14B

| $S_1$ | $W0_1$ | $W1_1$ | $W2_1$ | $W3_1$ |
|---|---|---|---|---|
| 0 | 8/16 | 5/16 | 2/16 | 1/16 |
| 1 | 12/16 | 2/16 | 2/16 | 0/16 |
| 2 | 10/16 | 2/16 | 3/16 | 1/16 |

FIG. 17A

| | $I_0=0$ $I_1=1$ | $I_0=1$ $I_1=1$ | $I_0=15$ $I_1=1$ | $I_0=31$ $I_1=1$ |
|---|---|---|---|---|
| $S_0=0$ $S_1=0$ | × | × | × | × |
| $S_0=1$ $S_1=1$ | ○ | ○ | × | × |
| $S_0=2$ $S_1=2$ | △ | △ | ○ | × |
| $S_0=0$ $S_1=1$ | ○ | × | △ | ○ |
| $S_0=2$ $S_1=1$ | ○ | × | ○ | × |

FIG. 17B

| | $I_0=1$ $I_1=1$ | $I_0=15$ $I_1=15$ | $I_0=31$ $I_1=31$ |
|---|---|---|---|
| $S_0=0$ $S_1=0$ | × | ○ | ○ |
| $S_0=1$ $S_1=1$ | ○ | × | × |
| $S_0=2$ $S_1=2$ | △ | △ | × |

× : DISAGREEABLE
△ : SOMEWHAT DISAGREEABLE
○ : EXCELLENT

FIG. 18

| | | | | | $I_0$ | | | | | |
|---|---|---|---|---|---|---|---|---|---|---|
| | 0 | 1 | 2~7 | 8 | 9~127 | 128 | 129 | 130~135 | 136 | 137~255 |
| 0 | $S_0=1, S_1=1$ | $S_0=1, S_1=1$ | $S_0=2, S_1=1$ | $S_0=2, S_1=1$ | $S_0=0, S_1=1$ | $S_0=1, S_1=1$ | $S_0=1, S_1=1$ | $S_0=2, S_1=1$ | $S_0=2, S_1=1$ | $S_0=0, S_1=1$ |
| 1 | $S_0=1, S_1=1$ | $S_0=1, S_1=1$ | $S_0=2, S_1=1$ | $S_0=2, S_1=1$ | $S_0=0, S_1=1$ | $S_0=1, S_1=1$ | $S_0=1, S_1=1$ | $S_0=2, S_1=1$ | $S_0=2, S_1=1$ | $S_0=0, S_1=1$ |
| 2~7 | $S_0=1, S_1=2$ | $S_0=1, S_1=2$ | $S_0=2, S_1=2$ | $S_0=2, S_1=2$ | $S_0=0, S_1=2$ | $S_0=1, S_1=2$ | $S_0=1, S_1=2$ | $S_0=2, S_1=2$ | $S_0=2, S_1=2$ | $S_0=0, S_1=2$ |
| 8 | $S_0=1, S_1=2$ | $S_0=1, S_1=2$ | $S_0=2, S_1=2$ | $S_0=2, S_1=2$ | $S_0=0, S_1=0$ | $S_0=1, S_1=2$ | $S_0=1, S_1=2$ | $S_0=2, S_1=2$ | $S_0=0, S_1=0$ | $S_0=0, S_1=0$ |
| 9~127 | $S_0=1, S_1=0$ | $S_0=1, S_1=0$ | $S_0=2, S_1=0$ | $S_0=0, S_1=0$ | $S_0=0, S_1=0$ | $S_0=1, S_1=0$ | $S_0=1, S_1=0$ | $S_0=2, S_1=0$ | $S_0=0, S_1=0$ | $S_0=0, S_1=0$ |
| 128 | $S_0=1, S_1=1$ | $S_0=1, S_1=1$ | $S_0=2, S_1=1$ | $S_0=2, S_1=1$ | $S_0=0, S_1=1$ | $S_0=1, S_1=1$ | $S_0=1, S_1=1$ | $S_0=2, S_1=1$ | $S_0=2, S_1=1$ | $S_0=0, S_1=1$ |
| 129 | $S_0=1, S_1=1$ | $S_0=1, S_1=1$ | $S_0=2, S_1=1$ | $S_0=2, S_1=2$ | $S_0=0, S_1=1$ | $S_0=1, S_1=1$ | $S_0=1, S_1=1$ | $S_0=2, S_1=1$ | $S_0=2, S_1=1$ | $S_0=0, S_1=1$ |
| 130~135 | $S_0=1, S_1=2$ | $S_0=1, S_1=2$ | $S_0=2, S_1=2$ | $S_0=2, S_1=2$ | $S_0=0, S_1=2$ | $S_0=1, S_1=2$ | $S_0=1, S_1=2$ | $S_0=2, S_1=2$ | $S_0=2, S_1=2$ | $S_0=0, S_1=2$ |
| 136 | $S_0=1, S_1=2$ | $S_0=1, S_1=2$ | $S_0=2, S_1=2$ | $S_0=0, S_1=0$ | $S_0=0, S_1=0$ | $S_0=1, S_1=2$ | $S_0=1, S_1=2$ | $S_0=2, S_1=2$ | $S_0=0, S_1=0$ | $S_0=0, S_1=0$ |
| 137~255 | $S_0=1, S_1=0$ | $S_0=1, S_1=0$ | $S_0=2, S_1=0$ | $S_0=0, S_1=0$ | $S_0=0, S_1=0$ | $S_0=1, S_1=0$ | $S_0=1, S_1=0$ | $S_0=2, S_1=0$ | $S_0=0, S_1=0$ | $S_0=0, S_1=0$ |

IMAGE PROCESSING APPARATUS AND METHOD

FIELD OF THE INVENTION

This invention relates to image processing in a printing apparatus. More particularly, the invention relates to image processing and a method thereof in an apparatus such as an ink-jet printing apparatus that expresses tones by pseudo-grayscale processing.

BACKGROUND OF THE INVENTION

The error diffusion method is known as an example of pseudo-halftone processing for expressing multivalued data by a binary value (see "An Adaptive Algorithm for Spatial Gray Scale", Proceedings of the Society for Information Display, 1975, Symposium Digest of Technical Papers, 1975, 36). The error diffusion method, where P represents a pixel of interest, v the density of this pixel, v0, v1, v2 and v3 the densities of pixels P0, P1, P2 and P3, respectively, neighboring the pixel of interest P, and T a threshold value for binarizing these densities, is a method of diffusing binarization error E at the pixel of interest P to the neighboring pixels P0, P1, P2, P3 by weighting coefficients determined empirically, thereby making mean density equal to the density of the original image macroscopically.

According to the error diffusion method, we can write the following with regard to output binary data Do:

if $v \geq T$ holds, then Do=1, $E=v-V\max$; (1)

if $v < T$ holds, then Do=0, $E=v-V\min$;

(where Vmax and Vmin represent maximum and minimum density, respectively);

$v0 = v0 + E \times W0$; (2)

$v1 = v1 + E \times W1$; (3)

$v2 = v2 + E \times W2$; (4)

$v3 = v3 + E \times W3$; (5)

(example of weighting coefficients: $W0=7/16$, $W1=1/16$, $W2=5/16$, $W3=3/16$).

Ordinarily, processing is executed while the pixel of interest is shifted in sequence with the raster scan, and often the neighboring pixels P0, P1, P2, P3 chosen are the pixel adjacent the pixel of interest with respect to the scanning direction, the pixel immediately preceding the pixel directly below the pixel of interest, the pixel directly below the pixel of interest and the pixel immediately following the pixel directly below the pixel of interest. Conversely, the pixel of interest receives diffused error from the immediately preceding pixel, the pixel directly above and the two pixels on both sides of the pixel directly above the pixel of interest. Further, there are cases where a pixel neighboring a pixel of interest is non-existent, such as when the pixel of interest is at the beginning or end of a line, or when a line is the first line or last line. As a consequence, a method often adopted in such case is to adopt zero as the weight applied to a non-existent pixel and distribute the binarization error to the other pixels.

Furthermore, if an image to be processed is one of uniform density, there are instances where a visually disagreeable arrangement of printed dots occurs (namely deterioration of visual characteristics). In order to prevent this, the specification of Japanese Patent Application Laid-Open No. 3-88570 discloses a pseudo-halftoning method of selecting optimum weighting coefficients W0, W1, W2, W3 in accordance with density v of the pixel of interest. This method is such that pseudo-halftoning is capable of preventing the visually disagreeable arrangement of printed dots (the deterioration of visual characteristics), which is ascribable to changes in the spatial frequency of the image.

However, a problem arises when pseudo-halftoning is applied to a color image composed of multiple colors, such as the four colors of cyan, magenta, yellow and black employed in color ink-jet printers or the like. Specifically, since each color is processed individually using a method such as the error diffusion method, excellent visual characteristics are obtained when the image of each color is observed but this is not necessarily the case with regard to superimposed images of two or more colors.

In an effort to improve upon this drawback, the specifications of Japanese Patent Application Laid-Open Nos. 8-279920 and 11-10918 disclose a pseudo-halftoning method of obtaining excellent visual characteristics even with regard to superimposed images of two or more colors by combining two or more colors and then applying the error diffusion method.

This error diffusion method applied upon combining two or more colors makes it easy to optimize spatial frequency with regard to the entirety of an image of two or more colors to which error diffusion processing has been applied. However, optimizing the spatial frequency of images on a per-color-component basis is difficult. For example, assume that a color image of two colors has been subjected to this improved error diffusion processing. In this case, the dots will be disposed at a uniform spacing if the two images that have undergone error diffusion processing are observed together. If the image of each color is observed individually, however, dots become connected and unsightly dot placement is the result.

SUMMARY OF THE INVENTION

Accordingly, an object of the present invention is to provide an image processing apparatus and method in which when the error diffusion method is applied to image data of two or more color components upon combining the images of these two or more colors, a visually optimum placement of printed dots can be achieved (i.e., image data having the optimum spatial frequency can be generated) even in a case where images of all color components are observed simultaneously and even in a case where images of the single color components are observed individually.

According to the present invention, the foregoing object is attained by providing an image processing apparatus for processing multivalued color image data that includes a plurality of color components, comprising: adding means for adding per-color-component quantization error values from a neighboring pixel to a respective ones of a plurality of color components included in a pixel of interest; quantization means for correlating a sum of the values of each of the color components to which the error value has been added by the adding means to a sum of values after conversion, and deciding the value of each color component after conversion upon distributing the sum of pixel values after the conversion in accordance with the ratio of each of the color components before conversion; and coefficient decision means for deciding diffusion coefficients, which diffuse quantization error to neighboring pixels, based upon the value of each of the plurality of color components included in the pixel of interest.

Preferably, if the color components are approximately equal to one another, the coefficient decision means decides the diffusion coefficients in such a manner that the same diffusion coefficients are used for each of the color components.

Preferably, if the value of each of the color components before quantization is greater than the value of each of the color components after quantization in regard to the pixel of interest, the coefficient decision means decides the diffusion coefficients in such a manner that the smaller the difference between these values, the greater the diffusion ratio of the error value diffused to a pixel that follows the pixel of interest.

Preferably, the coefficient decision means decides the diffusion coefficients in such a manner that the smaller the value of a certain color component before quantization in regard to the pixel of interest, the diffusion coefficients of the other color components are decided so as to increase the diffusion ratio of the error value diffused to the pixel that follows the pixel of interest.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a schematic view illustrating the content of a LUT in the error calculation means of the first embodiment;

FIG. 7 is a schematic view illustrating the content of a LUT in the error calculation means of the second embodiment;

Figures 9A, 9B:
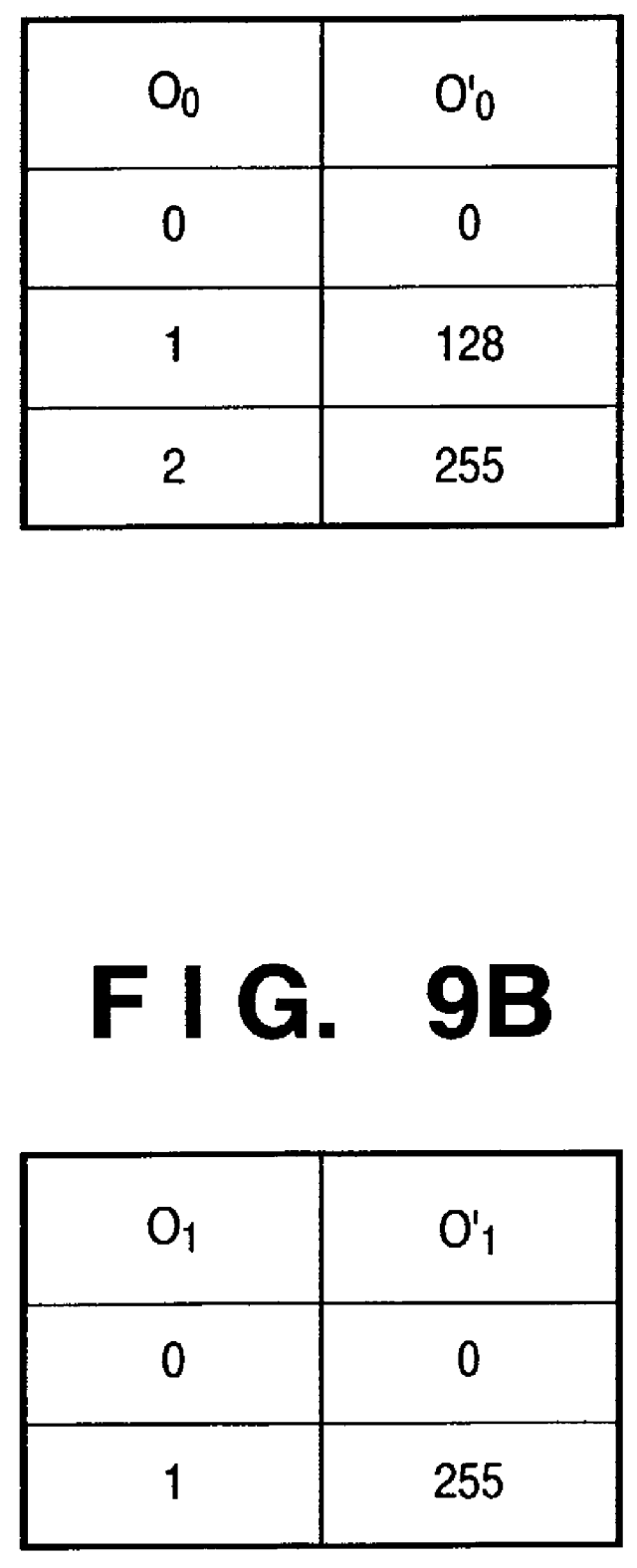

FIG. 9A is a diagram illustrating the content of a LUT ($O_0$) according to another embodiment;

FIG. 9B is a diagram illustrating the content of a LUT ($O_1$) according to another embodiment;

FIG. 10 is a schematic view illustrating the content of a LUT in the output decision means of the first embodiment;

FIG. 11 is a schematic view illustrating the content of a LUT in the output decision means of the second embodiment;

FIG. 13 is a table illustrating the content of a LUT in the weighting coefficient decision means of the first embodiment;

FIG. 14A is a diagram illustrating the content of a LUT ($S_0$) in the weighting coefficient decision means of the first embodiment;

FIG. 14B is a diagram illustrating the content of a LUT ($S_1$) in the weighting coefficient decision means of the first embodiment;

FIG. 17A is a diagram illustrating an example of result of evaluation regarding weighting coefficients of the first embodiment;

FIG. 17B is a diagram illustrating an example of result of evaluation regarding weighting coefficients of the first embodiment;

FIG. 18 is a table illustrating the content of a LUT in the weighting coefficient decision means of the second embodiment;

DETAILED DESCRIPTION OF THE PREFERRED EMBODIMENTS

First Embodiment

A first embodiment of the present invention will now be described in detail with reference to the drawings.

Figure 1:
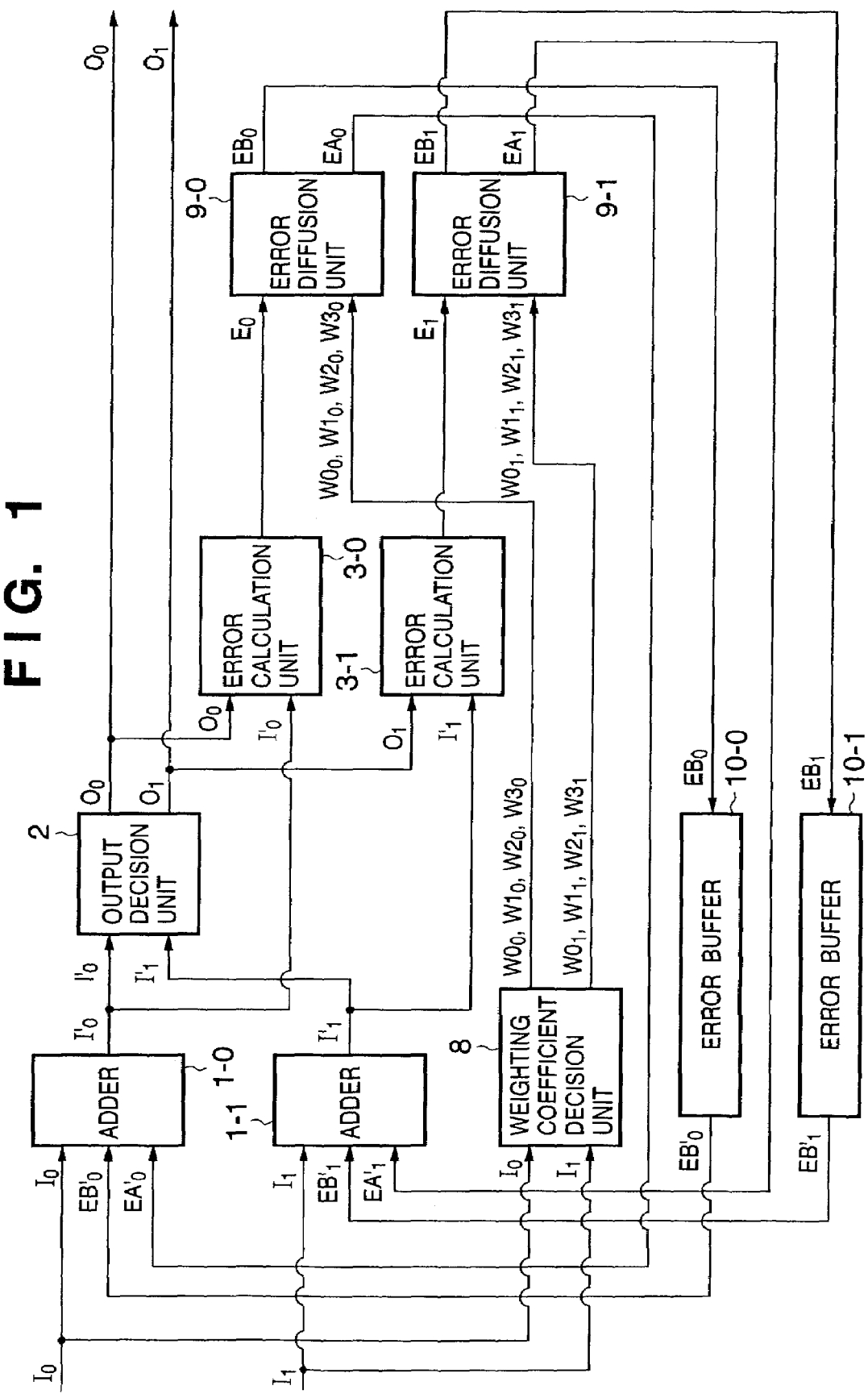
FIG. 1 is a block diagram illustrating the structure of an image processing apparatus according to a first embodiment of the present invention.

FIG. 1 is a block diagram illustrating the structure of an image processing apparatus according to a first embodiment of the present invention. The apparatus of FIG. 1 receives an input of 8-bit multivalued image data and outputs binary data by executing image processing.

As shown in FIG. 1, items of input-image pixel data $I_0$, $I_1$ of colors 0 (e.g., cyan) and 1 (e.g., magenta), which are items of 8-bit multivalued image data, are input to adders 1-0 and 1-1, respectively.

The multivalued image data $I_0$, $I_1$, error data $EB'_0$, $EB'_1$ from a line where pseudo-grayscale processing has previously been executed and error data $EA'_0$, $EA'_1$ from a neighboring (immediately preceding) pixel are input to the adders 1-0, 1-1, respectively, whereby these inputs are added and the sums delivered as outputs $I'_0$, $I'_1$, respectively.

Error buffers 10-0, 10-1 store the latest one line of error data that has already undergone pseudo-grayscale processing and output the error data $EB'_0$, $EB'_1$, which is added to a pixel of interest.

Figure 2:
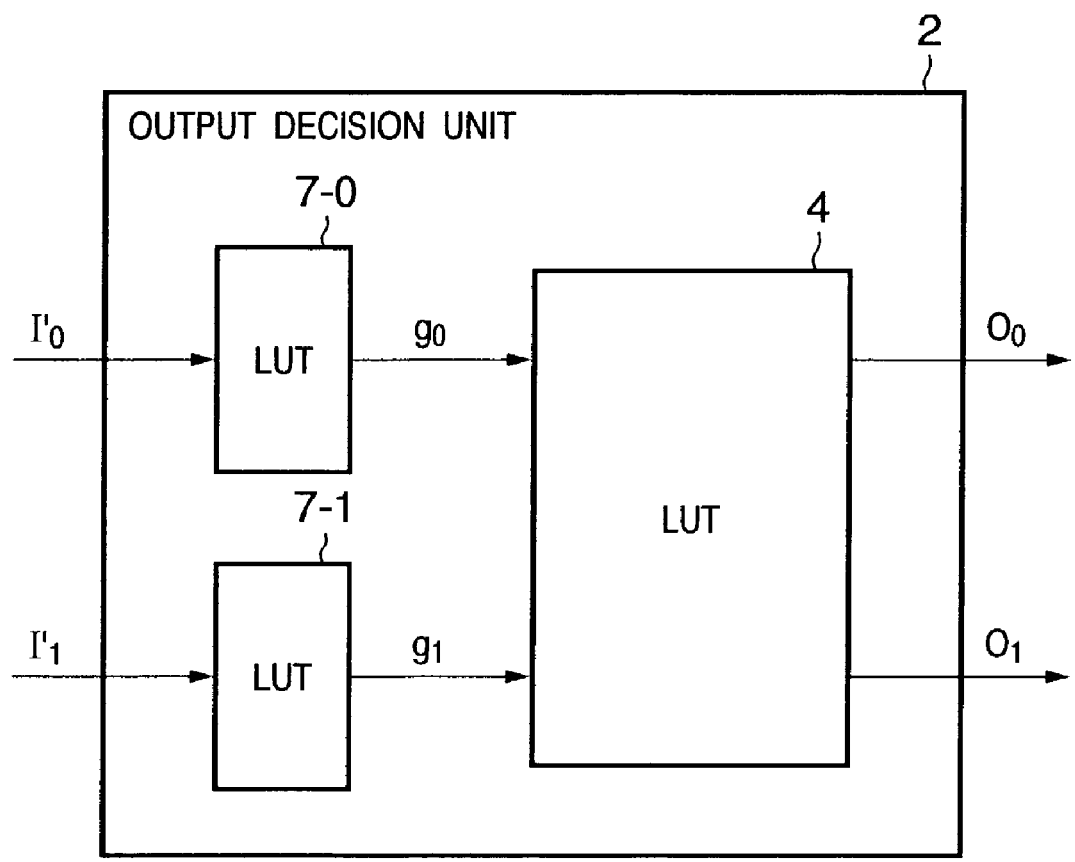
FIG. 2 is a block diagram illustrating the construction of output decision means according to the first embodiment.

The outputs $I'_0$, $I'_1$ of the adders 1-0, 1-1, respectively, are input to output decision unit 2. The output decision unit 2 is constituted by LUTs, as shown in FIG. 2, and executes the following processing: First, when the signals $I'_0$, $I'_1$ are input to the output decision unit 2 from the adders 1-0, 1-1, respectively, reference is had to one-dimensional LUTs 7-0, 7-1 in FIG. 2, from which two signals $g_0$, $g_1$ are respectively output.

FIG. 10 is a diagram illustrating the content of the one-dimensional LUTs 7-0, 7-1. FIG. 10 shows the values of the signals $g_0$, $g_1$ output in accordance with the values of the inputs $I'_0$, $I_1$. The LUTs 7-0, 7-1 have identical content. The values of the signals $g_0$, $g_1$, which are input to an N-dimensional (N=2 in this embodiment because the input image data is 2-color data) LUT 4, represent lattice points to which the input values $I'_0$, $I'_1$, respectively, are nearest along the axial directions. In other words, the values of the signals $g_0$, $g_1$ are values obtained by quantizing the input values by the values corresponding to the lattice points.

Figures 3A, 3B:
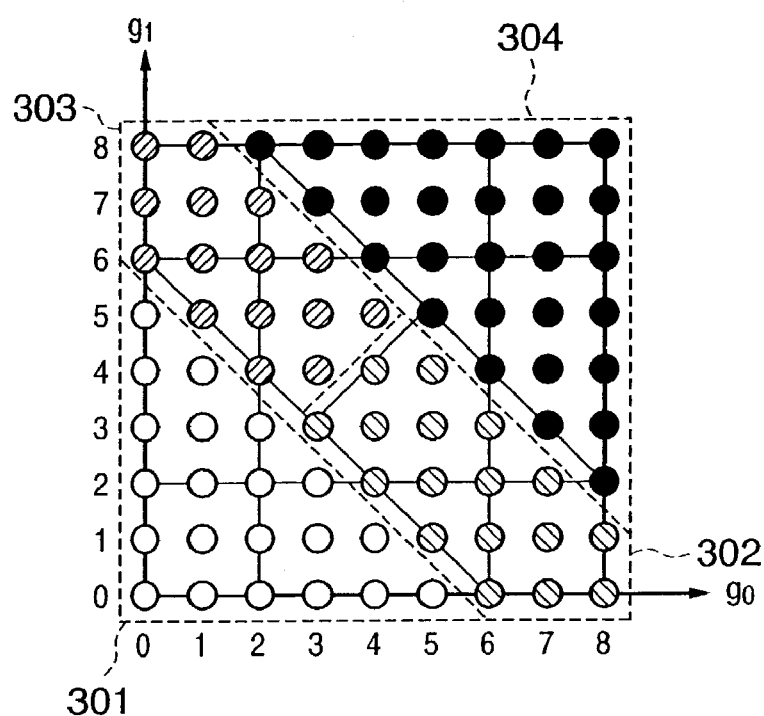
FIGS. 3A and 3B are schematic views illustrating the content of a LUT in the output decision means of the first embodiment.

FIGS. 3A and 3B illustrate the structure of the LUT 4. The horizontal axis in FIG. 3A represents the output $g_0$ from the LUT 7-0, and the vertical axis in FIG. 3A represents the output $g_1$ from the LUT 7-1. The four types of circular symbols in FIG. 3A indicate the values of outputs at the lattice points of the LUT 4, as indicated in FIG. 3B. If we let the output value of color 0 be $O_0$ and the output value of color 1 be $O_1$, then the four types of circular symbols indicate that outputs ($O_0$,$O_1$) at the lattice points are respective ones of the four types (0,0), (1,0), (0,1), (1,1). For example, if ($g_0$,$g_1$)=(6,7), then it will be understood from FIG. 3A that the symbol at this time is a black circle. If this value is read in FIG. 3B, therefore, it will be understood that the output ($O_0$,$O_1$) is (1,1). The actual LUT 4 is constructed in the form of a table in which a set of ($g_0$,$g_1$) and a set of ($O_0$,$O_1$) are correlated in accordance with FIGS. 3A, 3B.

For example, if ($I'_0$,$I'_1$)=(383,256) holds, then ($g_0$,$g_1$)=(8, 6) is output from the LUT of FIG. 10. If reference is had to FIGS. 3A, 3B based upon these values, i.e., if the LUT 4 is looked up, it will be understood that ($O_0$,$O_1$)=(1,1). Thus, if the signals $g_0$ and $g_1$ are output, one lattice point in the N-dimensional LUT 4 is decided and the output values at this lattice point are delivered as outputs $O_0$, $O_1$ of the output decision unit 2.

FIGS. 3A, 3B and FIG. 10 can be constructed as a single table, i.e., the LUTs 7-0, 7-1, 4 can be unified. In such case, $I'_0$, $I'_1$ would be plotted along the horizontal and vertical axes, respectively, instead of $g_0$, $g_1$ in FIG. 3A, and ($O_0$,$O_1$) would be disposed at the intersections of these values so as to achieve correspondence with FIG. 3A.

Figure 4:
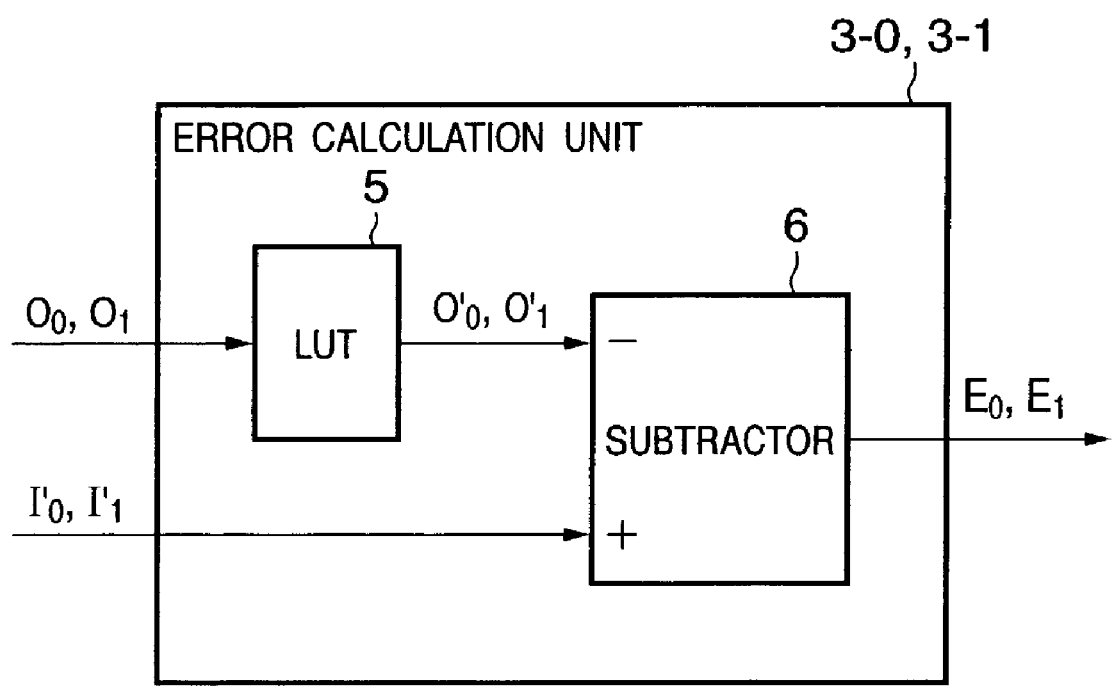
FIG. 4 is a block diagram illustrating the structure of error calculation means according to the first embodiment.
Figure 5:
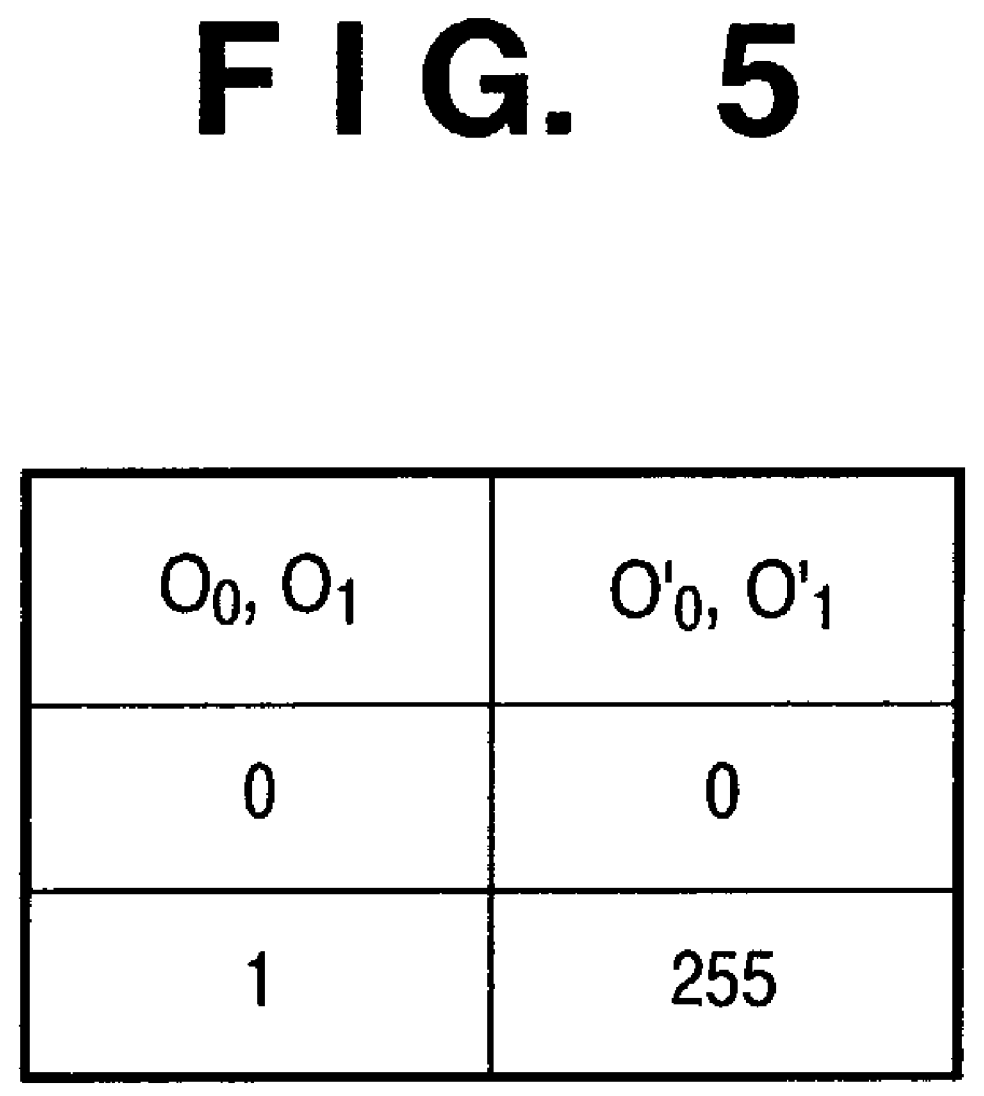

Furthermore, the outputs $O_0$, $O_1$ of the output decision unit 2 are input to error calculation unit 3-0, 3-1, respectively. The error calculation unit 3-0, 3-1 are constructed as shown in FIG. 4. The outputs $O_0$, $O_1$ of the output decision unit 2 and the outputs $I'_0$, $I'_1$ of the adders 1-0, 1-1 are input to the error calculation unit 3-0, 3-1, respectively, which proceed to output the errors $E_0$, $E_1$, respectively. When the outputs $O_0$, $O_1$ of the output decision unit 2 enter a one-dimensional LUT 5, as shown in FIG. 4, the LUT 5 is looked up and $O'_0$, $O'_1$ are output. As shown in FIG. 5, the outputs $O'_0$, $O'_1$ of the LUT 5 are values obtained by converting the outputs $O_0$, $O_1$ (values of 0 or 1 in this embodiment) of the output decision unit 2 to input signal levels (0 to 255; 0 or 255 in FIG. 5).

The outputs $O'_0$, $O'_1$ are subtracted respectively from the outputs $I'_0$, $I'_1$ of the adders 1-0, 1-1 by a subtractor 6, whereby the error outputs $E_0$, $E_1$ are obtained. In other words, we have the following:

$$E_0 = I'_0 - O'_0$$

$$E_1 = I'_1 - O'_1$$

The error $E_0$ and a set of weighting coefficients $W0_0$, $W1_0$, $W2_0$, $W3_0$ indicative of error diffusion to neighboring pixels are input to error diffusion unit 9-0, and the error $E_1$ and a set of weighting coefficients $W0_1$, $W1_1$, $W2_1$, $W3_1$ indicative of error diffusion to neighboring pixels are input to error diffusion unit 9-1. The error diffusion unit 9-0 outputs error data $EA_0$ directed to an adjacent pixel and error data $EB_0$ directed to the next line, and the error diffusion unit 9-1 outputs error data $EA_1$ directed to the adjacent pixel and error data $EB_1$ directed to the next line.

Figure 16:
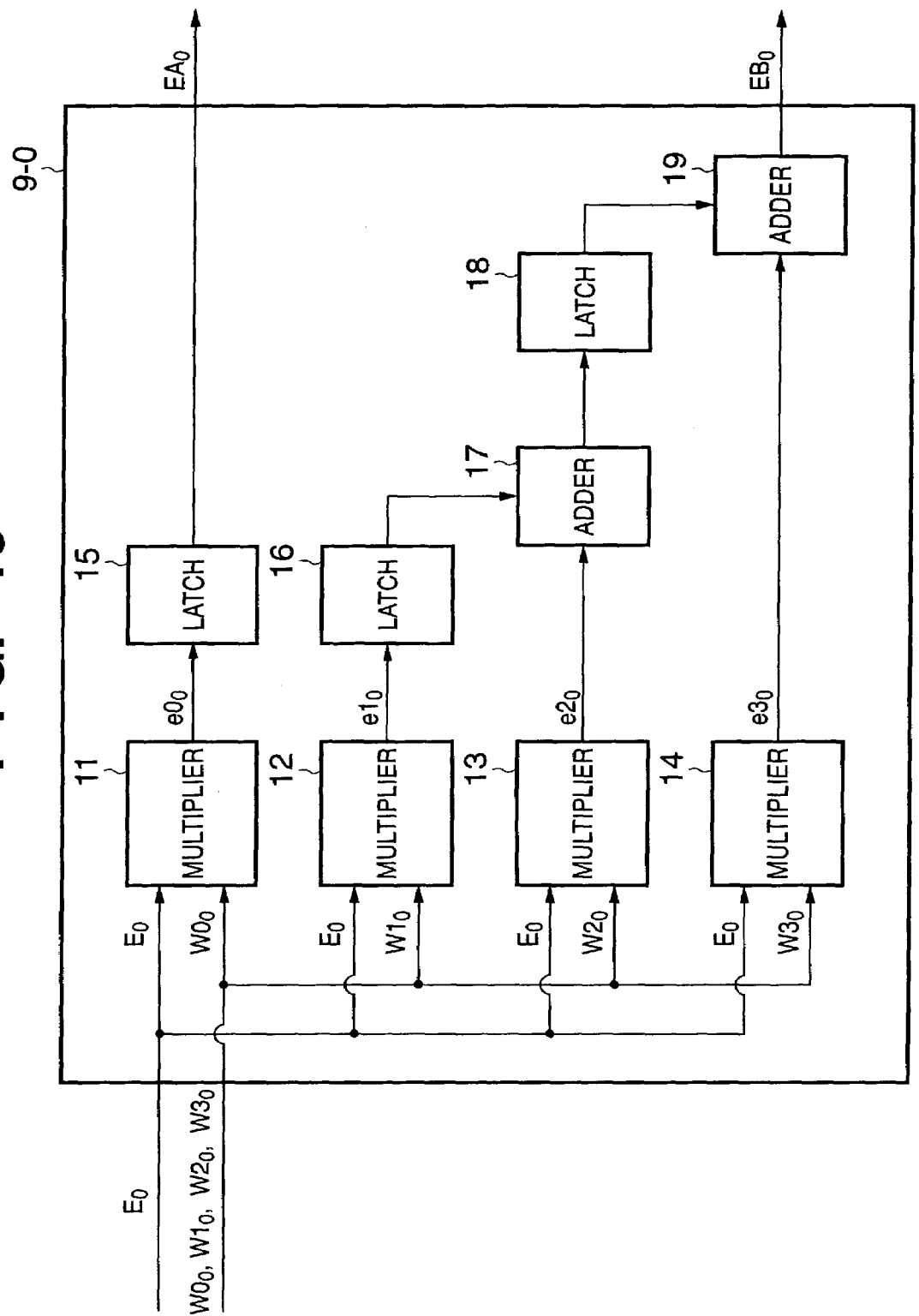
FIG. 16 is a block diagram illustrating structure of the error diffusion means of the first embodiment.

FIG. 16 illustrates the structure of the error diffusion unit 9-0. The error diffusion unit 9-0 has multipliers 11, 12, 13, 14 for multiplying the error $E_0$ by the weighting coefficients $W0_0$, $W1_0$, $W2_0$, $W3_0$, respectively, thereby outputting errors $e0_0$, $e1_0$, $e2_0$, $e3_0$ to be distributed. This is equivalent to the following operations:

$$e0_0 = E_0 \times W0_0$$

$$e1_0 = E_0 \times W1_0$$

$$e2_0 = E_0 \times W2_0$$

$$e3_0 = E_0 \times W3_0$$

Next, the error $e0_0$ is output as $EA_0$ after being delayed by one pixel by a latch 15. The error $e1_0$ is added to the error $e2_0$ by an adder 17 after being delayed by one pixel by a latch 16. Furthermore, the output of the adder 17 is added to the error $e3_0$ by an adder 19 after being delayed by one pixel by a latch 18. The sum calculated by the adder 19 is delivered as an output.

The above processing is equivalent to the following equations, where the coordinates of the pixel of interest are (x,y) and the errors at the pixel of interest are represented by $e0_0(x,y)$, $e1_0(x,y)$, $e2_0(x,y)$, $e3_0(x,y)$:

$$EA_0 = e0_0(x-1,y)$$

$$EB_0 = e1_0(x,y) + e2_0(x-1,y) + e3_0(x-2,y)$$

Similarly, the error diffusion unit 9-1 executes processing that is equivalent to the following operations:

$$e0_1 = E_1 \times W0_1$$

$$e1_1 = E_1 \times W1_1$$

$$e2_1 = E_1 \times W2_1$$

$$e3_1 = E_1 \times W3_1$$

$$EA_1 = e0_1(x-1,y)$$

$$EB_1 = e1_1(x,y) + e2_1(x-1,y) + e3_1(x-2,y)$$

By virtue of the above arrangement, binarization error of a pixel of interest is distributed to neighboring pixels in accordance with predetermined weighting, and a pseudo-grayscale image can be produced while the density of the original multivalued image is maintained overall. Furthermore, in the binarization processing, the image quality (visual characteristics) of the pseudo-grayscale image can be improved by using the LUT 4 of FIG. 2, FIGS. 3A, 3B and FIG. 10.

By way of example, in case of a set of two colors, namely color 0 and color 1, consider an image in which pixels of fixed values are uniformly distributed for both of these colors. Since the error between a binarization threshold value and value of the pixel of interest is diffused to neighboring pixels in accordance with weighting by pseudo-grayscale processing based upon the above-described error diffusion method in the aforesaid image, a pattern 0→1 or 1→0 occurs regularly in accordance with the pixel values and specific parameters in the image after binarization. As a result, with regard to an area having a certain area (number of pixels), mean density comparable with that the original image is maintained also in the binary image that has undergone pseudo-grayscale processing. However, the 0→1 or 1→0 pattern that is produced in this binary image becomes texture composed of a periodic pattern that does not originally exist in the image, thereby degrading image quality and resulting in the generation of a visually disagreeable image.

Furthermore, if binarization processing based upon the error diffusion method is executed independently for each color component of a color image, as in the prior-art example, texture is produced independently color by color. In a case where color images are observed in combined form, the texture per color component is emphasized as an interference pattern and image quality declines markedly, i.e., a visually disagreeable image is produced.

By contrast, according to this embodiment, the LUT illustrated in FIGS. 3A, 3B (and FIG. 10) is used is determining a binarization threshold value and, hence, the set $(O_0,O_1)$ of output values is given with regard to the set $(I'_0,I'_1)$ of pixel values following error-diffusion processing. Even if the image is one in which pixels of fixed values are evenly distributed with regard to each of the color components, binarization of one of the color components is carried out, taking into consideration the pixel value of the other color component prevailing after error diffusion, by executing binarization processing using the LUT of FIGS. 3A, 3B. Even in the above case, therefore, the pixel values of the plurality of color components will not change in the form of respectively independent patterns.

Figure 19A:
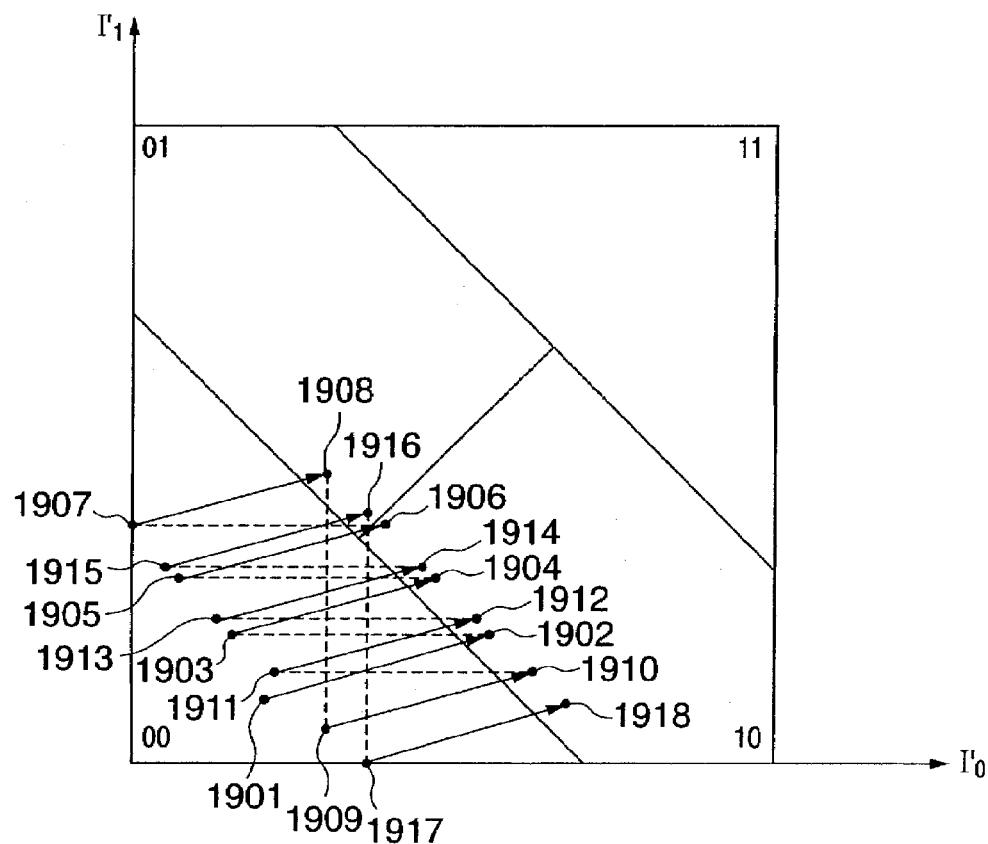
FIG. 19A is a diagram illustrating the principle according to which the occurrence of a periodic pattern is prevented in output decision means according to the first embodiment.
Figure 19B:
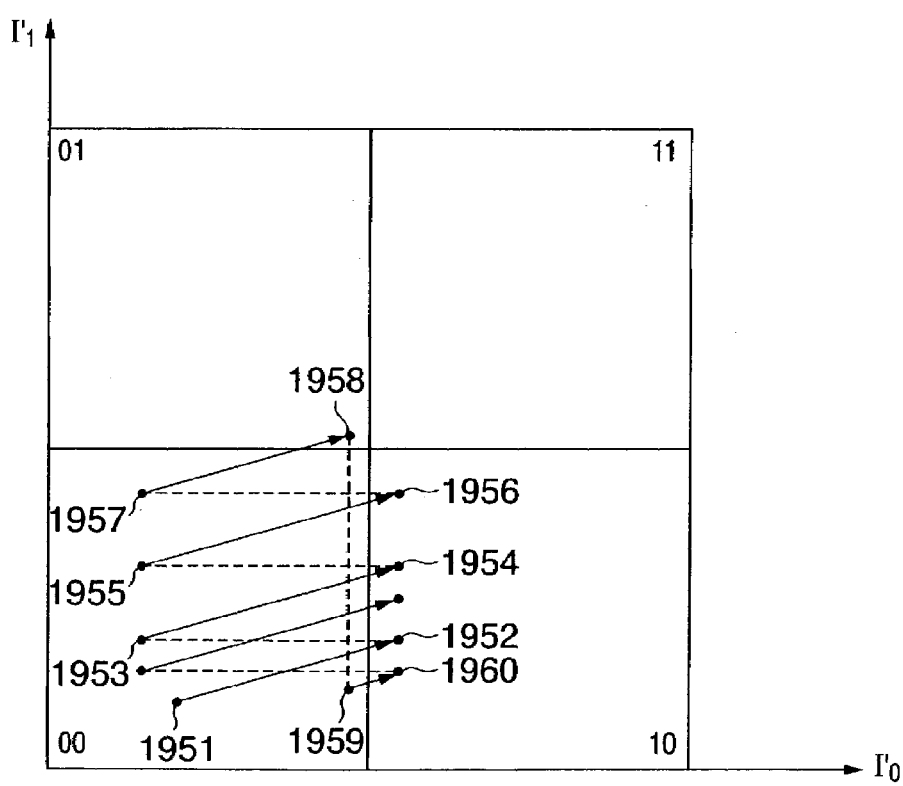
FIG. 19B is a diagram illustrating the principle according to which the occurrence of a periodic pattern is prevented in output decision means according to the prior art.

FIGS. 19A and 19B illustrate an example of this. FIG. 19A is a schematic view showing an example of binarization processing of a uniform image using a conversion LUT for converting $(I'_0,I'_1)$ to $(O_0,O_1)$ in this embodiment, and FIG. 19B is a schematic view showing an example of binarization processing of a uniform image using a conversion LUT for converting $(I'_0,I'_1)$ to $(O_0,O_1)$ in an example of the prior art. In FIGS. 19A, 19B, the horizontal and vertical axes indicate $I'_0$ and $I'_1$, respectively, and each of the divided areas indicates $0_0, 0_1$. The values of $0_0, 0_1$ are as indicated at a corner of each area, and the oriented lines indicate examples of contiguous pixels to be processed successively.

If a pixel value 1951 of an original image to be targeted initially is given in FIG. 19B, first a conversion is made to $(O_0,O_1)=(0,0)$, error accumulates in the pixel value of the pixel that follows this pixel, and the conversion to $(O_0,O_1)=(0,0)$ continues until a fixed threshold value is attained. First, a threshold value 1952 for conversion to 1 in reached in regard to $I'_0$, and the conversion to $(O_0,O_1)=(1,0)$ is made. The sign of the error is reversed with regard to $I'_0$, and the error is accumulated. With regard to $I'_1$, however, the conversion to 0 continues to be made and an error value similar to that thus far continues to accumulate. As a result, $(I'_0,I'_1)$ returns to a pixel value 1953. This operation continues in the following manner: pixel value 1954→1955→1956→1957. When pixel value 1958 is reached, now the value of $I'_1$ exceeds the threshold value for the conversion to 1. As a result, the sign of the error value is reversed and a pixel value 1959 is returned to in a manner similar to that of $I'_0$.

By repeating traversal of the above path, the conversion from $(I'_0,I'_1)$ to $(O_0,O_1)$ is carried out. In FIG. 19B, the change in the value of $O_0$ is the interval of pixel value 1953→1954, pixel value 1955→1956, and pixel value 1957→1958→1960. Further, since one oriented line indicates accumulation of amount of error that accumulates whenever the pixel of interest advances to the adjacent pixel, a fixed periodicity is observed by accumulating error a fixed value at a time. The same holds true with regard to $O_0$. Thus, the change to 0→1 or 1→ is repeated at respectively independent spatial periodicity while performing the conversion from $I'_0$ to $O_0$ and the conversion from $I'_1$ to $O_1$ entirely independently.

By contrast, if a pixel value 1901 of an original image to be targeted initially is given in FIG. 19A, then, in a manner similar to that of FIG. 19B, first a conversion is made to $(O_0,O_1)=(0,0)$, error accumulates in the pixel value of the pixel that follows this pixel, and the conversion to $(O_0,O_1)=(0,0)$ continues until a fixed threshold value is attained. First, a threshold value 1902 for conversion to 1 in reached in regard to $I'_0$, and the conversion to $(O_0,O_1)=(1,0)$ is made. The sign of the error is reversed with regard to $I'_0$, and the error is accumulated. With regard to $I'_1$, however, the conversion to 0 continues to be made and an error value similar to that thus far continues to accumulate. As a result, $(I'_0,I'_1)$ returns to a pixel value 1903. This operation continues in the following manner: pixel value 1904→1905→1906→1907. When pixel value 1908 is reached, now the value of $I'_1$ exceeds the threshold value for the conversion to 1. As a result, the sign of the error value is reversed and a pixel value 1909 is returned to in a manner similar to that of $I'_0$.

Though it may seem up to this point that periodicity is present also in FIG. 19A, error must accumulate until the pixel value arrives at 1910 from 1909 in order for the value of $O_0$ to change to 1 next. This produces a major disturbance in periodicity up to this point. The same is true with regard to $O_1$.

Thus, according to the procedure of this embodiment, changes in the values of binarized pixels of a plurality of color components have an influence upon each other, and this has the effect of breaking the monotonous periodicity produced with regard to the change in pixel values.

The above operation is such that the pseudo-grayscale processing of this embodiment is ascertained dynamically taking processing concerning a uniform image as an example. However, in a case where a specific pixel is taken as the pixel of interest, this processing can be ascertained statically. Specifically, in the pseudo-grayscale processing described above, the value of the sum of a plurality of pixel values following error diffusion regarding an original image is correlated with a value of the sum of a plurality of pixel values after binarization. How the value of the sum is distributed to each of the components is dependent upon the ratio of the components of the original pixel value. This should be evident from the fact that the sum of the pixel values of the two colors after conversion is constant along the direction of the diagonal from the upper left to the lower right of the conversion table shown in FIG. 3A. That is, a similar conversion can be carried out by comparing the sum of the values of each of the color components prior to conversion with a constant threshold value, first deciding the sum of the values after conversion in accordance with the result of the comparison, and then, with regard to the sum of the pixel values after the conversion, deciding the pixel values in such a manner that values are diffused to each of the color components after conversion in accordance with the ratio of the color components before the conversion.

As a result, the sum of the pixel values at the same position of each of the color components in the original image is reflected in the visual density in a case where these color components are observed together. This makes it possible to prevent a decline in image quality and deterioration of visual characteristics.

<Deciding Weighting Coefficients>

A characterizing feature of the present invention, namely weighting coefficient decision unit 8 for deciding the weighting coefficients $W0_0$, $W1_0$, $W2_0$, $W3_0$ and $W0_1$, $W1_1$, $W2_1$, $W3_1$, will now be described. According to this embodiment, besides adopting the above-described binarization LUT, inventive processing is executed in the decision of error-diffusion weighting coefficients.

Figure 15A:
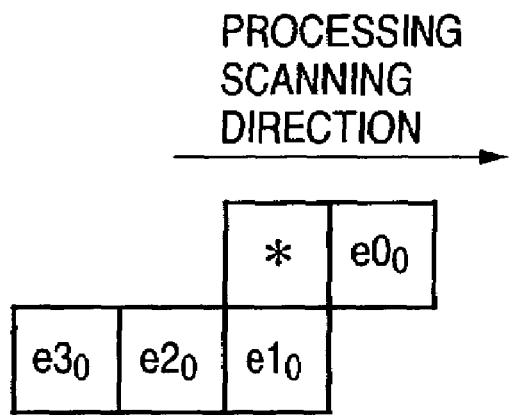
FIG. 15A is a schematic view illustrating error diffusion (from left to right)
Figure 15B:
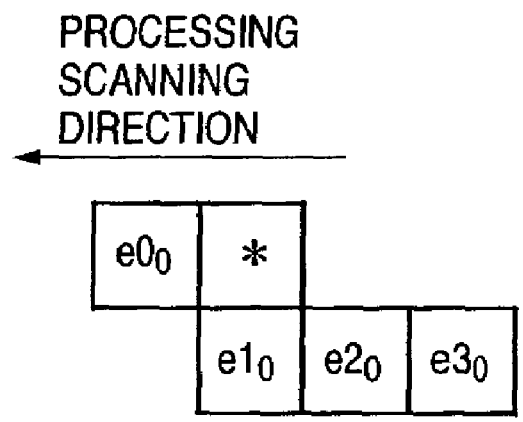
FIG. 15B is a schematic view illustrating error diffusion (from right to left)

As illustrated in FIG. 15A, error is distributed to a pixel alongside a pixel of interest "*", the pixel underlying this pixel of interest, a pixel diagonally below this pixel of interest and pixel along this latter pixel by the error diffusion unit 9-0, 9-1. Further, according to this embodiment, the direction in which pixels are processed is switched line by line. Consequently, the processing direction is as shown in FIG. 15B in a case where the direction is opposite that in FIG. 15A.

Figure 12:
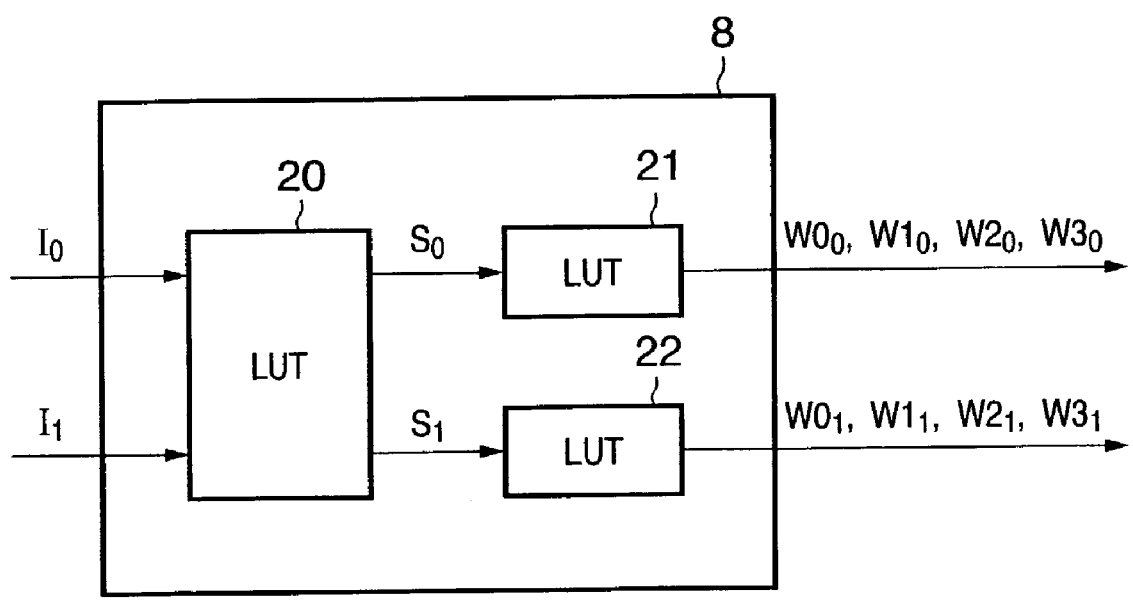
FIG. 12 is a block diagram illustrating the structure of weighting coefficient decision means according to the first embodiment.

As shown in FIG. 12, weighting coefficient decision unit 8 receives the signals $I_0$, $I_1$ as input values and outputs signals $S_0$, $S_1$ from a LUT 20. As illustrated in FIG. 13, the LUT 20 is composed of a table that outputs $S_0$, $S_1$ based upon the two inputs $I_0$, $I_1$. The signals $S_0$, $S_1$ are input to LUTs 21, 22, respectively, the LUT 21 outputs the weighting coefficients $W0_0$, $W1_0$, $W2_0$, $W3_0$ and the LUT 22 outputs the weighting coefficients $W0_1$, $W1_1$, $W2_1$, $W3_1$. In this embodiment, the neighboring pixel to which error is distributed is the same and therefore the content of LUT 21 is the same as that of LUT 22, as shown in FIGS. 14A and 14B. In other words, in this embodiment it does not matter if the same LUT is employed.

Processing of one item of input data is executed by the above arrangement. Accordingly, one line of processing is executed by repeating the above processing while effecting a shift one pixel at a time in the processing direction, and pseudo-grayscale processing of the entire image is possible by repeating similar processing while effecting a shift one raster at a time.

The significance of the structure of LUT 20 as shown in FIG. 13 will be described next. FIGS. 17A and 17B illustrate results of investigating image quality, namely visual excellence, in a case where pseudo-grayscale processing has been applied to a uniform color image in which color is given by several exemplary combinations of $I_0$ and $I_1$ while selecting $S_0$, $S_1$ within the weighting coefficient decision unit 8.

FIGS. 17A, 17B are tables in which values of sets of $I_0$, $I_1$ are adopted as the columns and combinations of $S_0$, $S_1$ used are adopted as the rows. With regard to the values of $S_0$, $S_1$, these correspond to the weighting coefficients depicted in FIGS. 14A, 14B. For instance, take an image in which 0, 1 holds for the two components $I_0$, $I_1$, respectively, as an example. If values 0, 0 are used as $S_0$, $S_1$, respectively, then the evaluation in this case will be "DISAGREEABLE", meaning that a low evaluation is given. On the other hand, if values 1, 1 are used as $S_0$, $S_1$, respectively, then the evaluation in this case is "EXCELLENT", meaning that the evaluation is high. FIGS. 17A, 17B are obtained as the result of trying binarization processing while changing weighting coefficients with regard to several representative values.

Results obtained by investigating an image in which the value of $I_1$ is held constant and only the value of $I_0$ is changed are shown in FIG. 17A. In FIGS. 17A, 17B, it will be understood that although the weighting coefficient $S_1=1$ for which the "EXCELLENT" evaluation has been obtained exists with regard to all values of $I_0$, excellent dot placement will not be obtained if the inputs $I_0$, $I_1$ are handled independently at other values. In other words, the selection of optimum weighting coefficients must be made in accordance with the combination of $I_0$ and $I_1$.

FIG. 13 shows a table in which weighting coefficients for which the high evaluation has been obtained are correlated with $I_0$, $I_1$. In FIG. 13, in which areas are demarcated by the bold lines, the weighting coefficients change from one area to the next. This selection method provides a weighting coefficient table in which the high evaluation is obtained even in the tables shown in FIGS. 17A, 17B. Densities not shown in FIGS. 17A, 17B also are evaluated empirically in a manner similar to that of FIGS. 17A, 17B and the table of FIG. 13 is constructed in accordance with the results.

The characterizing feature of FIG. 13 is that in a case where $I_0$, $I_1$ take on substantially the same values (the diagonal from the upper left to the lower right of FIG. 13), the weighting coefficient table used also is the same with regard to $I_0$, $I_1$, and in a case where $I_0$ and $I_1$ differ from each other, the weighting coefficient table also is implemented with a different distribution. Furthermore, weighting coefficient tables for which the values of $I_0$, $I_1$ are rendered symmetrical are selected. In other words, if the values of $I_0$, $I_1$ have been interchanged, the weighting coefficient tables used with regard to each of the colors also are interchanged.

Furthermore, only in a case where the pixel values are 2 and 15 with regard to each color in FIG. 13 is the weighting coefficient table used for the sake of this color component changed in accordance with the value of the other color component. At values other than these, the weighting coefficient table is selected only in accordance with one of the pixel values.

Furthermore, as the pixel value increases, the proportion of the error value distributed to the pixel that follows the pixel of interest is reduced and the proportion of the error value distributed to the next line is enlarged. If the size of the pixel value becomes 16 or greater, the weighting coefficient table used with regard to this color is fixed at $S_0$ and is changed within a small range of 0 to 15.

If this is considered in application to FIG. 19A, the following may be construed: Specifically, the slope of the oriented lines in FIG. 19A indicates the ratio of error values distributed to each of the color components at the pixel of interest by a first cycle of binarization processing. Accordingly, the slope changes depending upon the ratio of the error value of each color. As a result, the slope of the oriented lines is changed by changing only one of the error values that accumulate with regard to each color component by the first cycle of binarization processing. The number of changeovers of the value regarding the color 0 produced until the output value changes over from (0,1) to (1,0) also changes. For example, if the slope is enlarged in the example of FIG. 19A, the number of repetitive patterns produced with regard to the color 0 during the time that the output value changes from (0,1) to (1,1) becomes small. If this number is small, periodicity does not readily manifest itself. Accordingly, the occurrence of texture in each color component can be suppressed by enlarging the slope. In FIG. 19A, pixel values from 1901 to 1908 correspond to the above-mentioned pattern repetition, and the repetition periodicity is disturbed by the return of the pixel value to 1909. If the slope of each oriented line is enlarged at this time, the area in which the output values become (0,1) should be reached with a smaller number oriented lines.

Changing over the weighting coefficient in the manner illustrated in FIG. 13 corresponds to changing the slope of the oriented lines in FIG. 19A, and the effect of enlarging the slope with regard to a pixel having a small value is incorporated in the table of FIG. 13. Execution of such control is limited to small pixel values because if a pixel value increases to a certain degree, pixel density in the binarized image also increases and texture itself becomes inconspicuous in a case where individual color elements are observed.

As a result of the above arrangement, the image processing apparatus according to the present invention converts a color image composed of a plurality of color elements to a pseudo-grayscale image in such a manner that a decline in image quality will not be brought about. This makes it possible to output an image of higher quality.

This embodiment has been described with regard to a case where two colors is adopted as one set. However, three or four colors can be adopted as a set, binarization processing applied to combinations of these values and error weightings converted in conformity with the pixel values. Though this arrangement becomes much more complicated, what is common with the present embodiment is that binarization processing is not executed independently with regard to each color component and combined binarized values are applied in accordance with the combined values. These values are obtained by correlating values of sums of each of the components before and after binarization and making the distribution of values of each of the color components after binarization conform to the distributions before binarization.

Furthermore, with regard also to the weighting coefficients of error diffusion, the optimum proportions are decided by the combinations of values of each of the color components in the original image, thereby making it possible to improve image quality. Though the method of deciding the proportions may be determined experimentally, the determination can also be made based upon the considerations cited above.

The binary image thus obtained is input to printer engine (not shown) of an ink-jet printer or the like and is printed and fixed as a permanent image.

Second Embodiment

In this embodiment, it is assumed that there are three gray levels, namely 0, 1 and 2, for each of the outputs $O_0$, $O_1$.

In this case, the structure of the processing apparatus itself is unchanged from that of the first embodiment shown in FIG. 1 but the contents of the LUTs 7-0, 7-1, LUT 4 and LUT 5 in the output decision unit 2 and error calculation unit 3-0, 3-1, which are components in the image processing apparatus, are different.

FIGS. 11, 6A, 6B and 7 illustrate the contents of the LUTs 7-0, 7-1, LUT 4 and LUT 5 in the second embodiment of the invention.

FIG. 11 illustrates the content of the LUTs 7-0, 7-1. FIG. 11 shows the values of the signals $g_0$, $g_1$, output in accordance with the values of the inputs $I'_0$, $I'_1$.

In the case of this embodiment, this content is adopted because the number of output gray levels is three with regard to each input and the number of lattice points seven for each input.

Figures 6A, 6B:
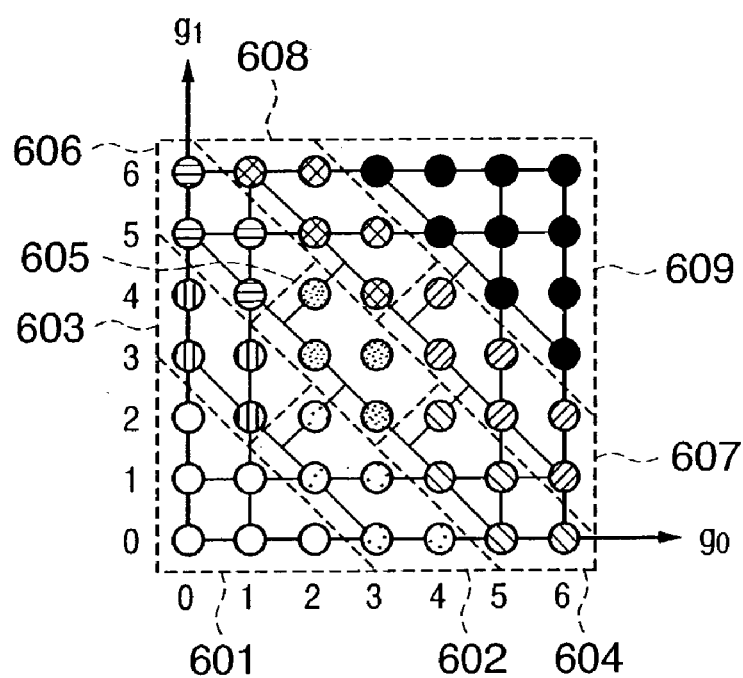
FIGS. 6A and 6B are schematic views illustrating the content of a LUT in output decision means according to a second embodiment of the present invention.
Figures 8A, 8B:
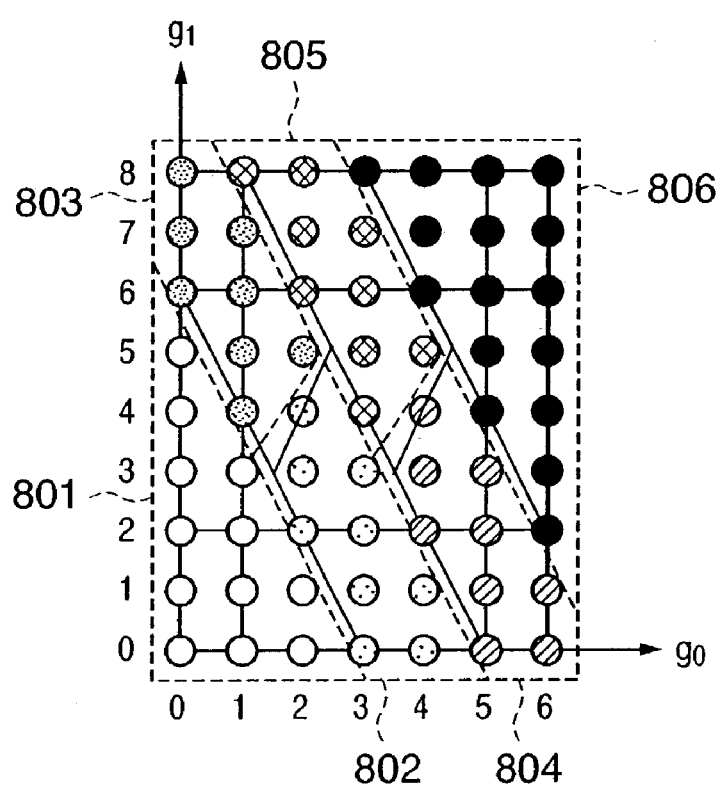
FIGS. 8A and 8B are schematic views illustrating the content of a LUT in output decision means according to another embodiment of the present invention.

FIGS. 6A and 6B illustrate the structure of the LUT 4. The horizontal axis in FIG. 6A represents the output $I'_0$ from the adder 1-0, and the vertical axis in FIG. 6A represents the output $I'_1$ from the adder 1-1.

The nine types of symbols in FIGS. 6A, 6B indicate the values of outputs at the lattice points of the LUT. If we let the output value of color 0 be $O_0$ and the output value of color 1 be $O_1$, then the symbols indicate that outputs $(O_0,O_1)$ at the lattice points are respective ones of the four types (0,0), (1,0), (0,1), (2,0), (1,1), (0,2), (2,1), (1,2), (2,2).

The processing by output decision unit 2 is as follows: In a manner similar to that where the number of gray levels is two, $I'_0$ and $I'_1$ enter from the adders 1-0, 1-1, the LUT shown in FIGS. 6A, 6B is looked up, lattice points closest to the input values are selected and the output values at the lattice points are delivered as outputs $O_0$, $O_1$ of the output decision unit 2.

The outputs $O_0$, $O_1$ of the output decision means 2 are input to the error calculation unit 3-0, 3-1, respectively.

Figure 7:
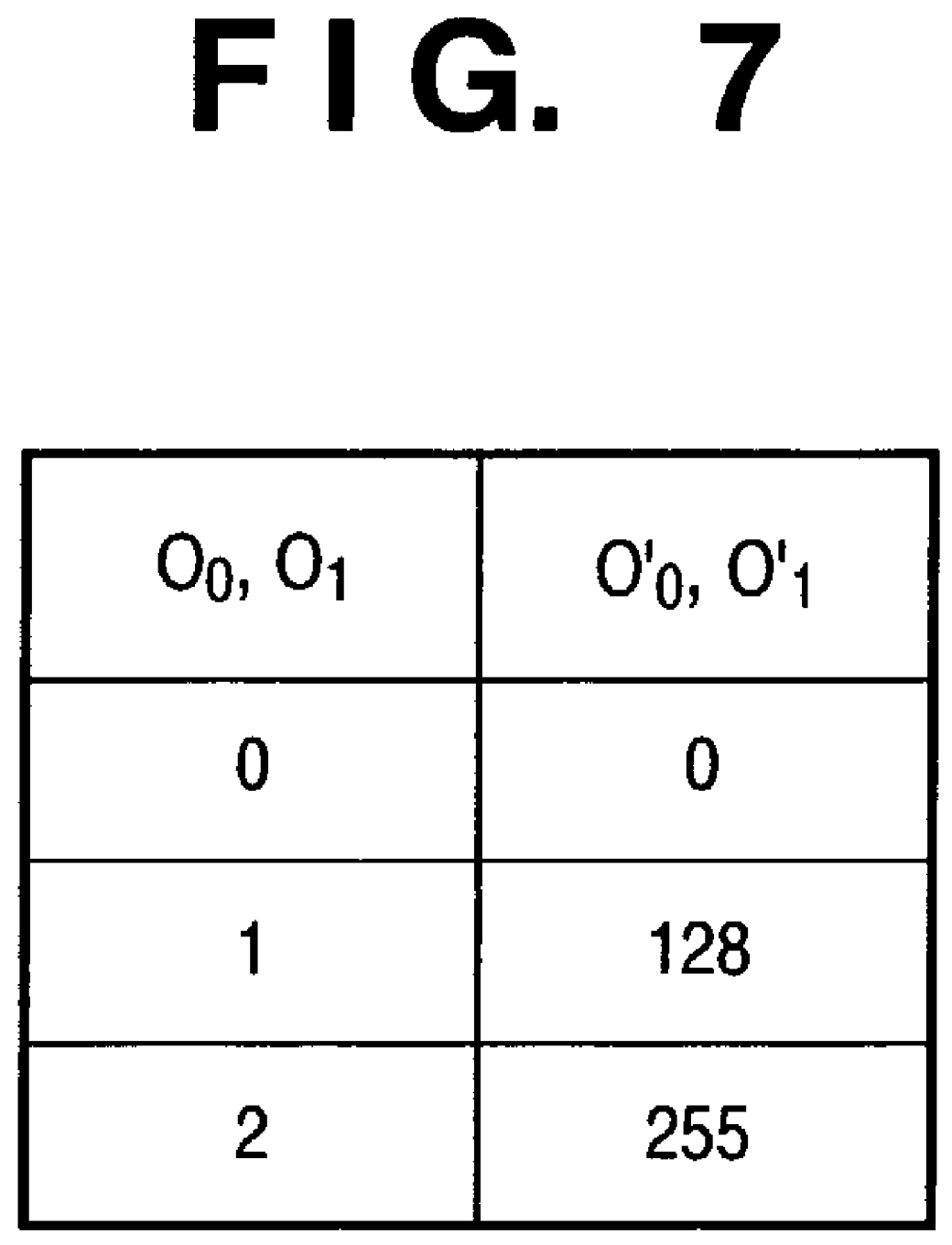

The error calculation unit 3-0, 3-1 refer to the one-dimensional LUT of the kind shown in FIG. 7, find $O'_0$, $O'_1$ from $O_0$, $O_1$ and calculate the errors $E_0$, $E_1$ in a manner similar to that of the above-described example. In other words, the following calculations are performed:

$$E_0 = I'_0 - O'_0$$

$$E_1 = I'_1 - O'_1$$

The LUT 20 in the coefficient decision unit is set to the parameters shown in FIG. 18.

By processing similar to that in the case where the number of gray levels of the outputs $O_0$, $O_1$ is two each, it is possible to deal with a case where the number of gray levels of the outputs $O_0$, $O_1$ is three each.

This arrangement is such that even in a case where a multivalued color image is converted by the error diffusion method to an image having fewer gray levels than the original image, a plurality of color components at a pixel of interest are adopted as a set and a conversion is made so as to correlate the sum thereof to the sum of pixel values after conversion, whereby a high-quality image can be obtained.

In FIG. 6A, the sum of pixel values after conversion is 0 in an area 601, the sum of pixel values after conversion is 1 in areas 602 and 603, the sum of pixel values after conversion is 2 in areas 604 to 606, the sum of pixel values after conversion is 3 in areas 607 and 608, and the sum of pixel values after conversion is 4 in an area 609. Areas in which the same sums have the same values are disposed along the diagonal from the upper left to the lower right of FIG. 6A. This disposition is such that if the sum of $g_0$ and $g_1$ is constant, then the sum of the pixel values after conversion also will be constant.

It should be evident from FIG. 7 that error is calculated using 0, 128, 255, which are values after the ternary conversion, as the reference. As a result, the distribution of pixels after the ternary conversion becomes sporadic even in the vicinity of values where pixel values in the vicinity of the reference values slightly exceed the reference values because the error values generated become small. Texture is thus readily produced. In FIG. 18, therefore, the distribution of error is controlled very finely, in a manner similar to that of the table shown in FIG. 13, in the range of pixel values 128 to 136, and occurrence of texture is suppressed effectively.

Other Embodiments

In the output decision unit of the above embodiments, LUTs are used. However, as disclosed in the specifications of Japanese Patent Application Laid-Open Nos. 8-279920 and 11-10918, etc., similar results are obtained even if use is made of processing that decides the outputs $O_0$, $O_1$ sequentially by conditional branching conforming to the inputs $I'_0$, $I'_1$.

Further, the outputs produced by the weighting coefficient decision means are made $S_0$, $S_1$, and the error calculation by the error diffusion means can be speeded up by putting $e0_0$, $e1_0$, $e2_0$, $e3_0$ and $e0_1$, $e1_1$, $e2_1$, $e3_1$, which are the result of error diffusion corresponding to the entered $S_0$, $S_1$ and of division of $E_0$, $E_1$, into the form of a LUT.

Thus, the weighting coefficient decision unit is not limited to an arrangement that outputs the weighting coefficients themselves, and it will suffice if parameters that have been associated with weighting coefficients are output to each error diffusion unit.

Further, weighting coefficients may be decided using values obtained after the inputs $I_0$, $I_1$ in the weighting coefficient decision unit are passed through a low-pass filter such as one that calculates the running mean of a plurality of pixels.

Further, the present invention can be applied also to a case where a grayscale conversion has been performed by the error diffusion method using three values for one color component and two values for the other color component, as shown in FIGS. 8A, 8B and FIGS. 9A, 9B. The essentials in this case are similar to those of the first and second embodiments.

In accordance with the present invention, as described above, it is possible to achieve a visually optimum placement (spatial frequency) of printing dots, even in a case where the error diffusion method is used upon combining two or more colors, by providing adding means, to which a multivalued image signal of two or more colors is input, for adding, on a per-color basis, error signals from a pixel that has already undergone pseudo-grayscale processing to respective one of the colors; output decision means, to which outputs from each of the adding means are input, for deciding a pseudo-grayscale output for every color; error calculation means for each color for calculating an error at a pixel of interest based upon an output for every color from the output decision means and outputs from the adding means for every color; error diffusion means for distributing (diffusing) the error for every color to neighboring pixels; and weighting coefficient means, to which the multivalued image signal is input, for deciding, on a per-color basis, an error diffusion allocation in the error diffusion means.

Thus, in a case where two or more colors are combined and the error diffusion method is used, it is possible to achieve a visually optimum placement (spatial frequency) of printing dots.

In particular, the ratio at which error is diffused to neighboring pixels is decided depending upon a combination of values of a plurality of color components at a pixel of interest and is not decided independently for each individual color component, thereby suppressing the occurrence of periodic texture in the image of each color component. This makes it possible to suppress interference patterns caused by interference between textures.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for processing multivalued color image data that includes a plurality of color components, comprising:
   an adding unit to add per-color-component quantization error values from a neighboring pixel to respective ones of a plurality of color components included in a pixel of interest;
   a quantization unit to correlate a sum of the values of each of the color components to which the error value has been added by the adding unit to a sum of values after conversion, and deciding the value of each color component after conversion upon distributing the sum of pixel values after the conversion in accordance with the ratio of each of the color components before conversion; and
   a coefficient decision unit to decide diffusion coefficients, which diffuse quantization error to neighboring pixels, based upon the value of each of the plurality of color components included in the pixel of interest,
   wherein if the value of each of the color components before quantization is greater than the value of each of the color components after quantization in regard to the pixel of interest, said coefficient decision unit decides the diffusion coefficients in such a manner that the smaller the difference between these values, the greater the diffusion ratio of the error value diffused to a pixel that follows the pixel of interest.

2. The apparatus according to claim 1, wherein if the color components are approximately equal to one another, the coefficient decision unit decides the diffusion coefficients in such a manner that the same diffusion coefficients are used for each of the color components.

3. An image processing apparatus for processing multivalued color image data that includes a plurality of color components, comprising:
   an adding unit to add per-color-component quantization error values from a neighboring pixel to respective ones of a plurality of color components included in a pixel of interest;
   a quantization unit to correlate a sum of the values of each of the color components to which the error value has been added by the adding unit to a sum of values after conversion, and deciding the value of each color component after conversion upon distributing the sum of pixel values after the conversion in accordance with the ratio of each of the color components before conversion; and
   a coefficient decision unit to decide diffusion coefficients, which diffuse quantization error to neighboring pixels, based upon the value of each of the plurality of color components included in the pixel of interest,
   wherein the coefficient decision unit decides the diffusion coefficients in such a manner that the smaller the value of a certain color component before quantization in regard to the pixel of interest, the diffusion coefficients of the other color components are decided so as to increase the diffusion ratio of the error value diffused to a pixel that follows the pixel of interest.

4. The apparatus according to claim 3, wherein if the color components are approximately equal to one another, the coefficient decision unit decides the diffusion coefficients in such a manner that the same diffusion coefficients are used for each of the color components.

5. A program embodied on a computer readable medium for causing multivalued color image data that includes a plurality of color components to be processed by a computer, said program causing the computer to execute the following steps of:
   adding per-color-component quantization error values from a neighboring pixel to respective ones of a plurality of color components included in a pixel of interest;
   correlating a sum of the values of each of the color components to which the error value has been added by said adding step to a sum of values after conversion, and deciding the value of each color component after conversion upon distributing the sum of pixel values after the conversion in accordance with the ratio of each of the color components before conversion; and deciding diffusion coefficients, which diffuse quantization error to neighboring pixels, based upon the value of each of the plurality of color components included in the pixel of interest, wherein if the value of each of the color components before quantization is greater than the value of each of the color components after quantization in regard to the pixel of interest, said deciding step decides the diffusion coefficients in such a manner that the smaller the difference between these values, the greater the diffusion ratio of the error value diffused to a pixel that follows the pixel of interest.

6. A program embodied on a computer readable medium for causing multivalued color image data that includes a plurality of color components to be processed by a computer, said program causing the computer to execute the following steps of:

adding per-color-component quantization error values from a neighboring pixel to respective ones of a plurality of color components included in a pixel of interest;

correlating a sum of the values of each of the color components to which the error value has been added by said adding step to a sum of values after conversion, and deciding the value of each color component after conversion upon distributing the sum of pixel values after the conversion in accordance with the ratio of each of the color components before conversion; and deciding diffusion coefficients, which diffuse quantization error to neighboring pixels, based upon the value of each of the plurality of color components included in the pixel of interest, wherein said deciding step decides the diffusion coefficients in such a manner that the smaller the value of a certain color component before quantization in regard to the pixel of interest, the diffusion coefficients of the other color components are decided so as to increase the diffusion ratio of the error value diffused to a pixel that follows the pixel of interest.

7. An image processing method for processing multivalued color image data that includes a plurality of color components, comprising:

an adding step of adding per-color-component quantization error values from a neighboring pixel to respective ones of a plurality of color components included in a pixel of interest;

a quantization step of correlating a sum of the values of each of the color components to which the error value has been added by the adding step to a sum of values after conversion, and deciding the value of each color component after conversion upon distributing the sum of pixel values after the conversion in accordance with the ratio of each of the color components before conversion; and a coefficient decision step of deciding diffusion coefficients, which diffuse quantization error to neighboring pixels, based upon the value of each of the plurality of color components included in the pixel of interest, wherein if the value of each of the color components before quantization is greater than the value of each of the color components after quantization in regard to the pixel of interest, said coefficient decision step decides the diffusion coefficients in such a manner that the smaller the different between these values, the greater the diffusion ratio of the error value diffused to a pixel that follows the pixel of interest.

8. The method according to claim 7, wherein if the color components are approximately equal to one another, said coefficient decision step decides the diffusion coefficients in such a manner that the same diffusion coefficients are used for each of the color components.

9. An image processing method for processing multivalued color image data that includes a plurality of color components, comprising:

an adding step of adding per-color-component quantization error values from a neighboring pixel to respective ones of a plurality of color components included in a pixel of interest;

a quantization step of correlating a sum of the values of each of the color components to which the error value has been added by the adding step to a sum of values after conversion, and deciding the value of each color component after conversion upon distributing the sum of pixel values after the conversion in accordance with the ratio of each of the color components before conversion; and a coefficient decision step of deciding diffusion coefficients, which diffuse quantization error to neighboring pixels, based upon the value of each of the plurality of color components included in the pixel of interest, wherein said coefficient decision step decides the diffusion coefficients in such a manner that the smaller the value of a certain color component before quantization in regard to the pixel of interest, the diffusion coefficients of the other color components are decided so as to increase the diffusion ratio of the error value diffused to a pixel that follows the pixel of interest.

10. The method according to claim 9, wherein if the color components are approximately equal to one another, said coefficient decision step decides the diffusion coefficients in such a manner that the same diffusion coefficients are used for each of the color components.

* * * * *

UNITED STATES PATENT AND TRADEMARK OFFICE
CERTIFICATE OF CORRECTION

| | |
|---|---|
| PATENT NO. | : 7,265,874 B2 |
| APPLICATION NO. | : 10/410347 |
| DATED | : September 4, 2007 |
| INVENTOR(S) | : Osamu Iwasaki et al. |

It is certified that error appears in the above-identified patent and that said Letters Patent is hereby corrected as shown below:

COLUMN 16:

Line 10, "different" should read --difference--.

Signed and Sealed this

Twenty-seventh Day of January, 2009

JOHN DOLL
*Acting Director of the United States Patent and Trademark Office*